United States Patent
Tanaka et al.

(10) Patent No.: US 6,925,062 B2
(45) Date of Patent: Aug. 2, 2005

(54) ATM TEST EQUIPMENT OPERABLE AS SOURCE AND RESPONDER FOR CONDUCTING MULTIPLE TESTS

(75) Inventors: Hironao Tanaka, Tokyo (JP); Hiroshi Kawakami, Kanagawa (JP); Shin Nakamura, Kanagawa (JP); Masaru Furukaya, Kanagawa (JP)

(73) Assignees: NEC Corporation, Tokyo (JP); NTT DoCoMo, Inc., Tokyo (JP)

( * ) Notice: Subject to any disclaimer, the term of this patent is extended or adjusted under 35 U.S.C. 154(b) by 932 days.

(21) Appl. No.: 09/737,780

(22) Filed: Dec. 18, 2000

(65) Prior Publication Data

US 2001/0053130 A1 Dec. 20, 2001

(30) Foreign Application Priority Data

Dec. 17, 1999 (JP) .......................................... 11-359043

(51) Int. Cl.$^7$ ................................................ H04L 1/00
(52) U.S. Cl. .................... 370/241.1; 370/248; 370/249; 370/250; 370/252
(58) Field of Search .................................. 370/233, 234, 370/235, 241, 244, 245, 236.1, 241.1, 248, 249, 250, 252, 253; 379/1.01, 1.03, 1.04, 2, 9

(56) References Cited

U.S. PATENT DOCUMENTS

| | | | |
|---|---|---|---|
| 5,440,565 A | | 8/1995 | Miyamoto et al. .......... 370/248 |
| 5,450,394 A | * | 9/1995 | Gruber et al. ............... 370/253 |
| 5,457,700 A | * | 10/1995 | Merchant ..................... 714/744 |
| 5,802,082 A | * | 9/1998 | Roppel ........................ 714/815 |
| 5,812,528 A | * | 9/1998 | VanDervort ................. 370/235 |
| 5,875,177 A | * | 2/1999 | Uriu et al. ................... 370/244 |
| 6,023,455 A | * | 2/2000 | Takahashi .................... 370/249 |

FOREIGN PATENT DOCUMENTS

| | | | | |
|---|---|---|---|---|
| JP | 2-288750 A | 11/1990 | ........... H04L/12/54 |
| JP | 3-231537 A | 10/1991 | |
| JP | 4-207544 A | 7/1992 | |
| JP | 5-191442 A | 7/1993 | |
| JP | 5-244196 A | 9/1993 | |
| JP | 5-327753 A | 12/1993 | |
| JP | 5-344145 A | 12/1993 | |
| JP | 7-87089 A | 3/1995 | |
| JP | 8-237258 A | 9/1996 | |
| JP | 8-307421 A | 11/1996 | |
| JP | 9-139745 A | 5/1997 | |
| JP | 9-238139 A | 9/1997 | |
| JP | 9-247160 A | 9/1997 | |
| JP | 11-275079 A | 10/1999 | |

* cited by examiner

*Primary Examiner*—Dang Ton
*Assistant Examiner*—Shick Hom
(74) *Attorney, Agent, or Firm*—Sughrue Mion, PLLC

(57) ABSTRACT

ATM test equipment are used as a source node and a responder node for conducting a test in a number of modes. At the source node, a test cell is formulated according to a selected test mode with a header identifying the source node and a responder node and a test mode value identifying the selected test mode, and transmits the test cell to an ATM network, and receives a response cell from the network to analyze data contained in the received response cell according to the test mode value of the response cell. The response cell is formulated at the responder node with a header identifying the responder node and the source node and the test mode value of the received test cell. At the responder node, data contained in the received test cell is also analyzed according to the test mode value of the test cell.

27 Claims, 13 Drawing Sheets

LOOPBACK MODE

TWO-WAY MODE

HANDSHAKING MODE

SOURCE AND RESPONDER NODES (LOOPBACK MODE)

SOURCE AND RESPONDER NODES (TWO-WAY MODE)

SOURCE NODE (HANDSHAKING MODE)

RESPONDER NODE (HANDSHAKING MODE)

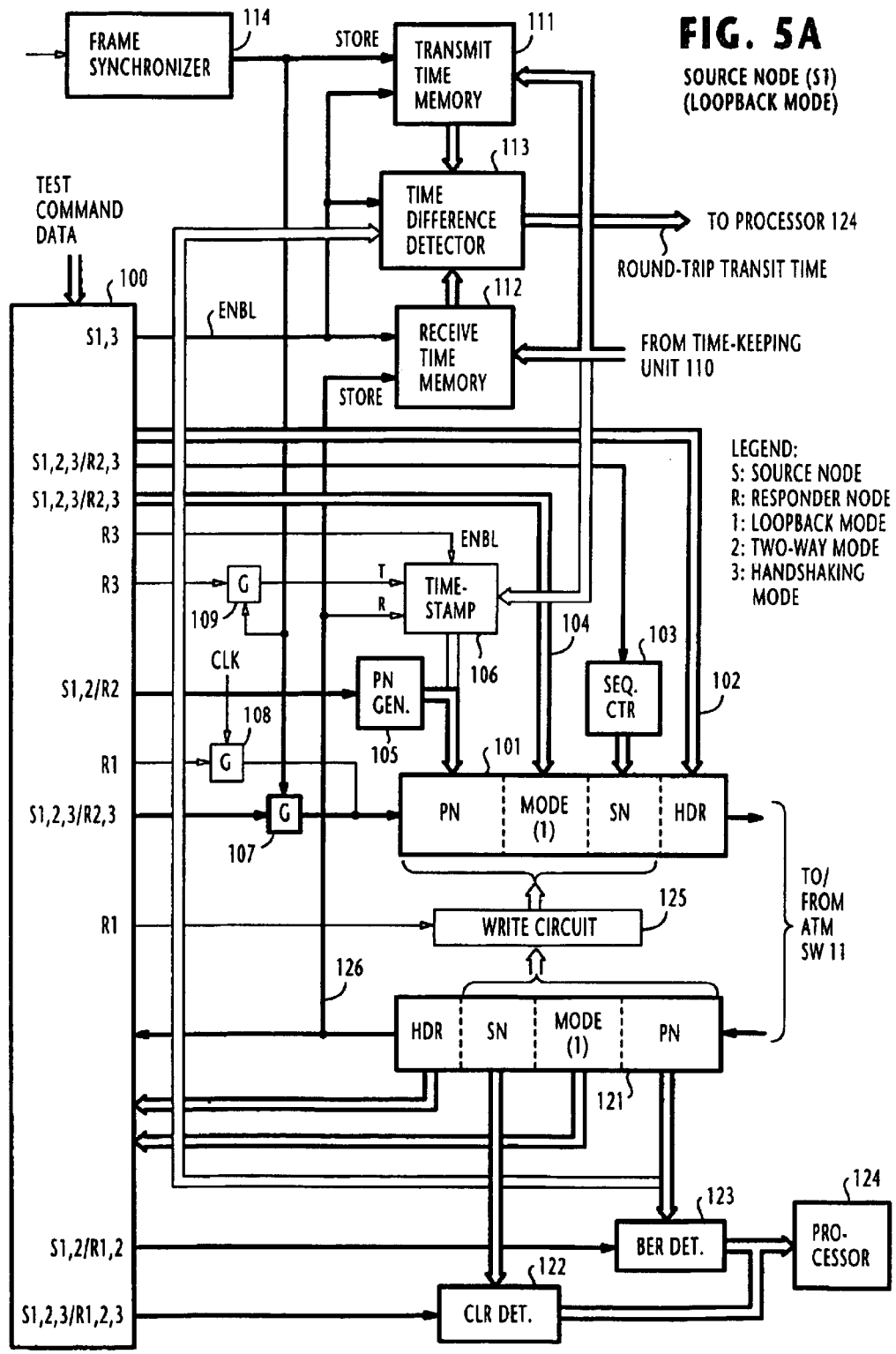

RESPONDER NODE (R1)
(LOOPBACK MODE)

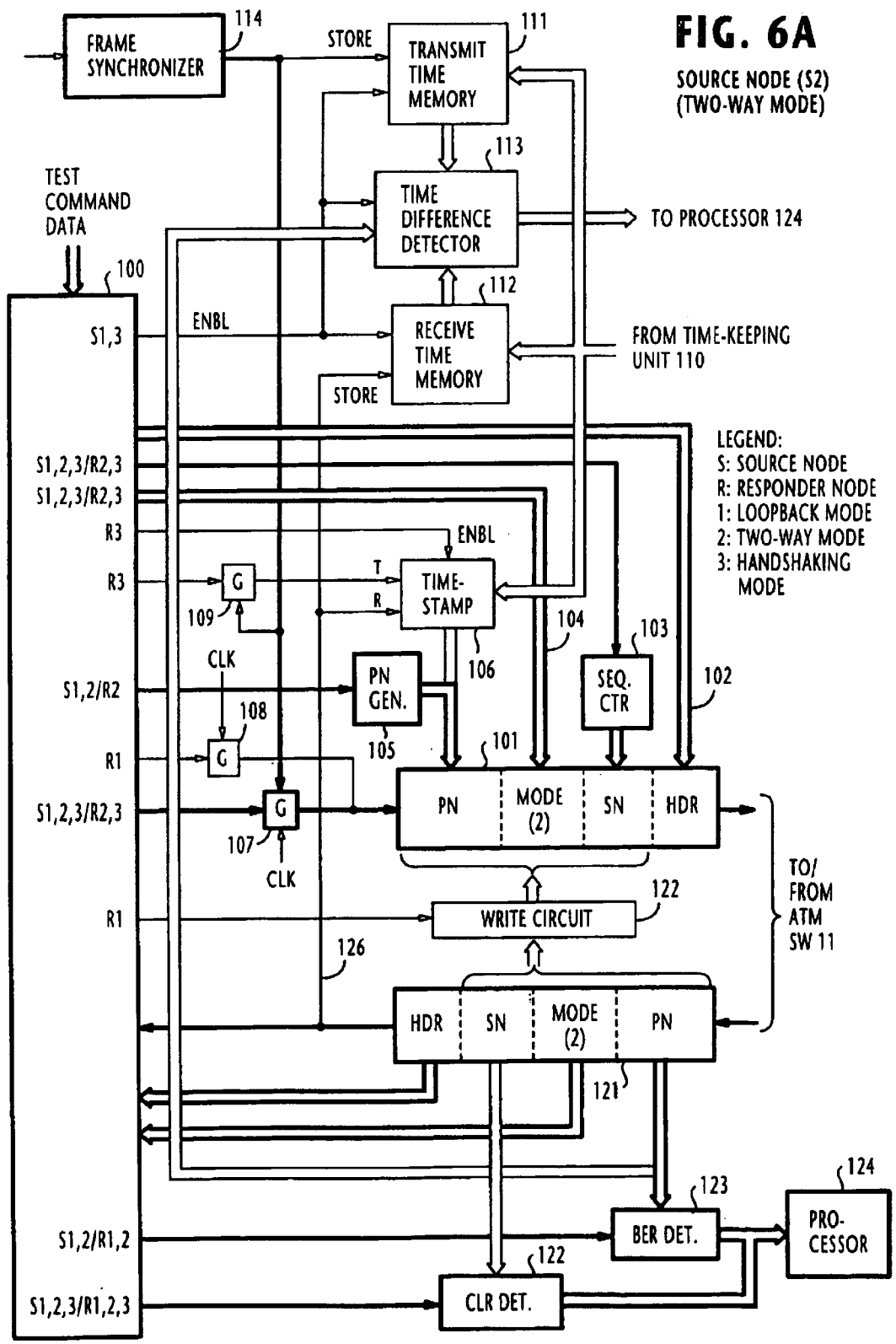

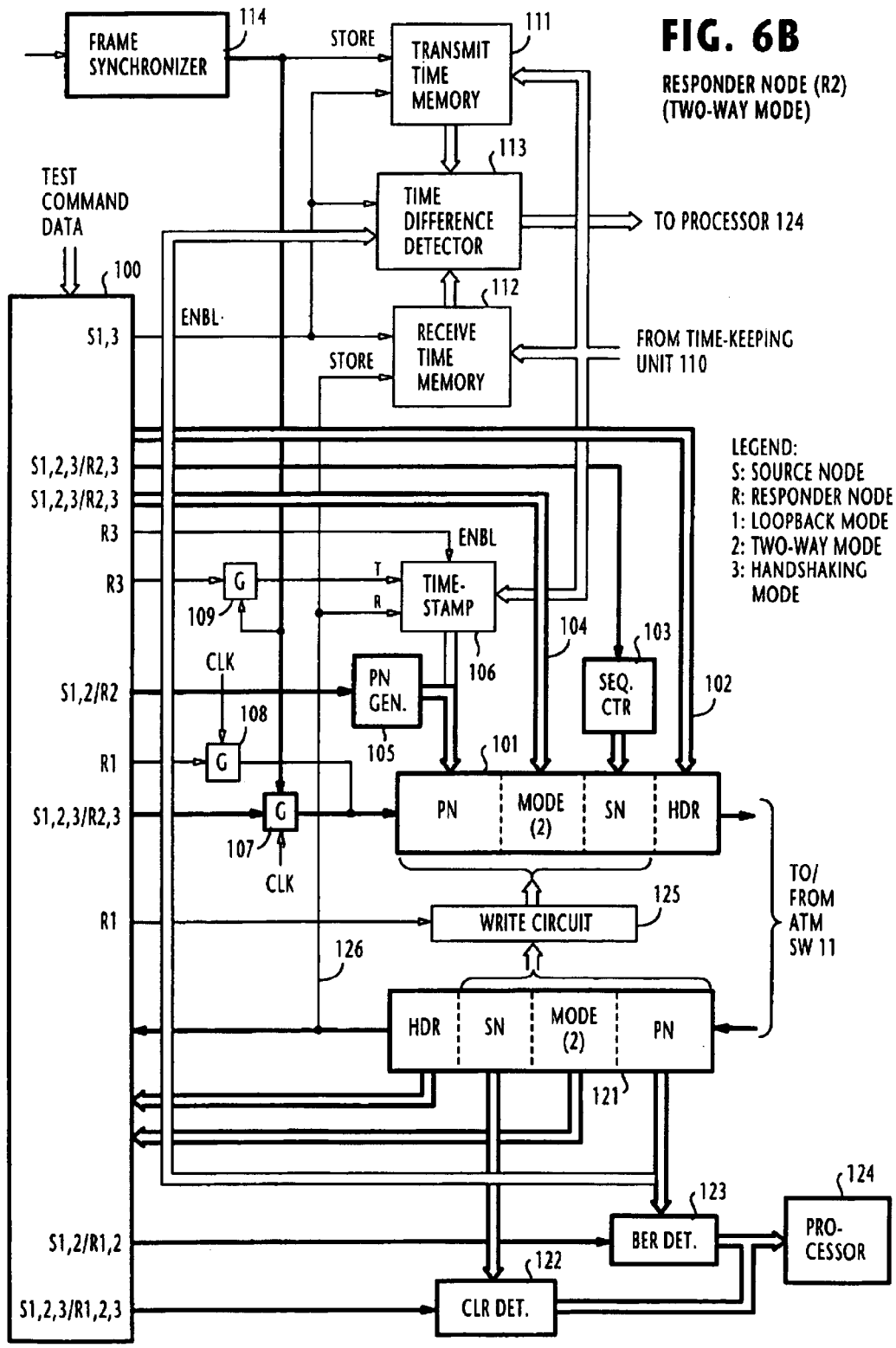

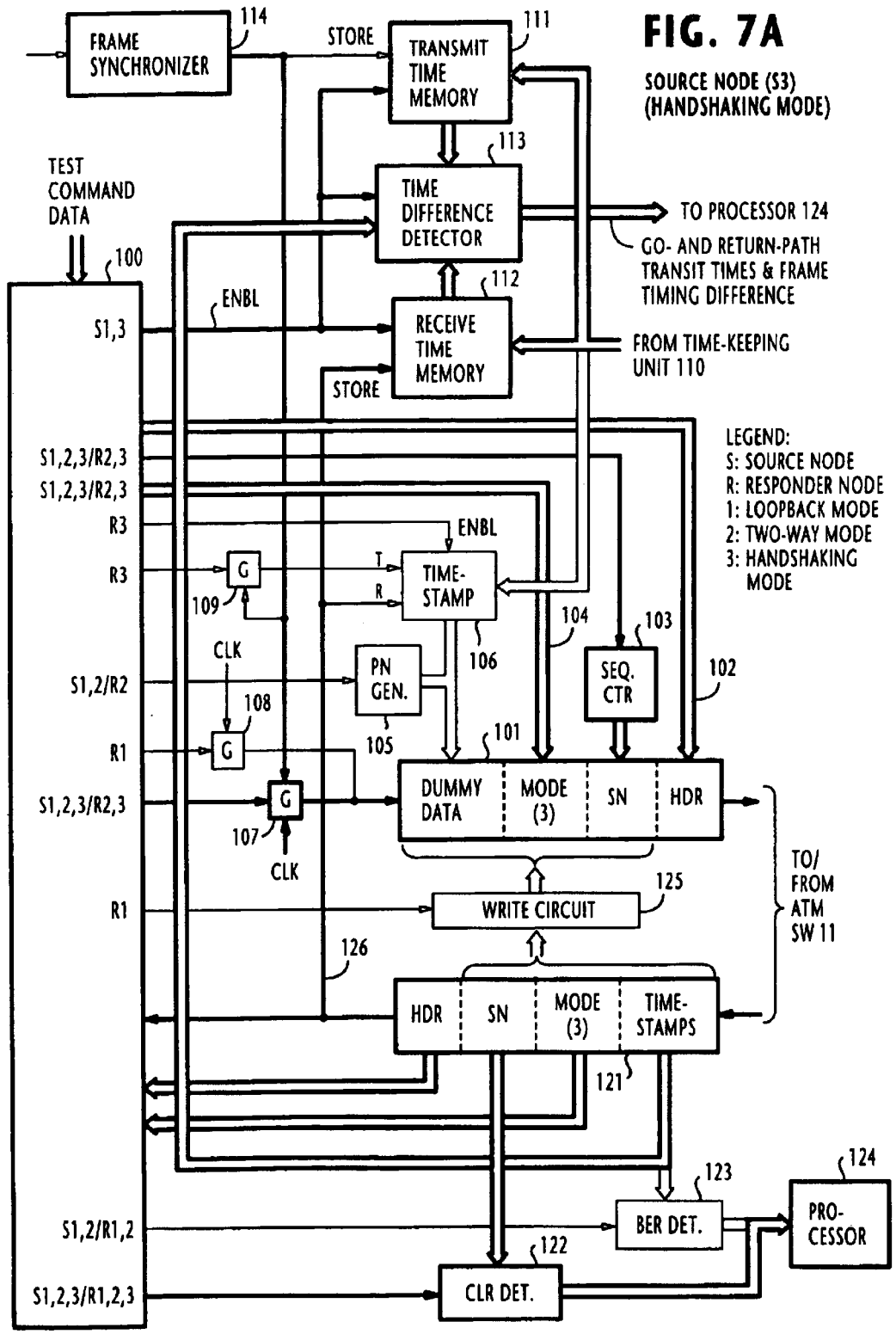

RESPONDER NODE (R3)
(HANDSHAKING MODE)

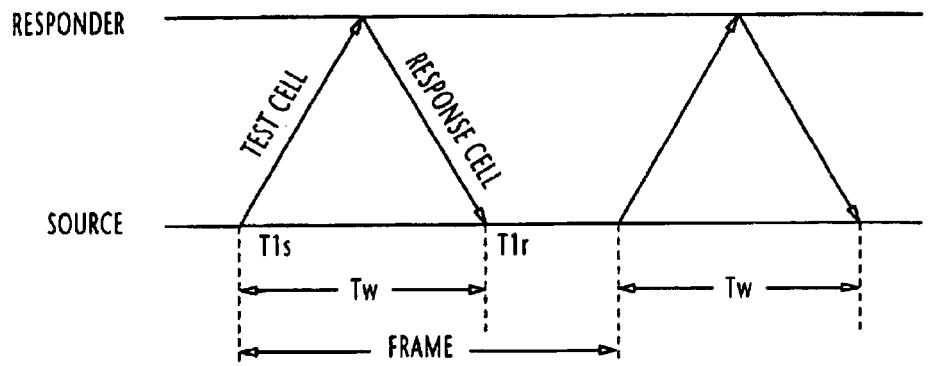
FIG. 8A  LOOPBACK MODE
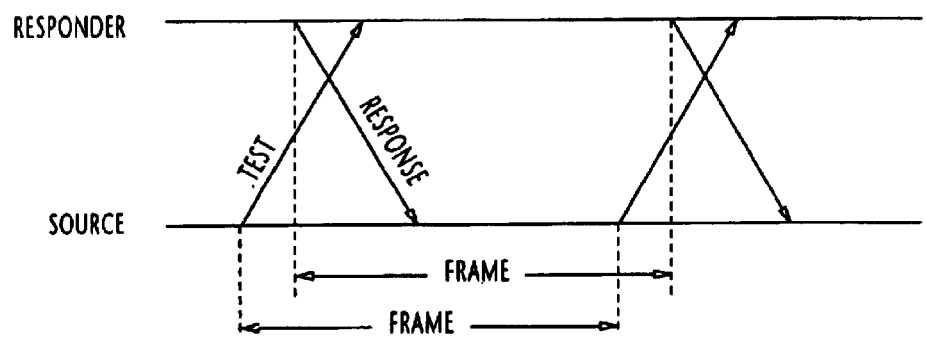
FIG. 8B  TWO-WAY MODE
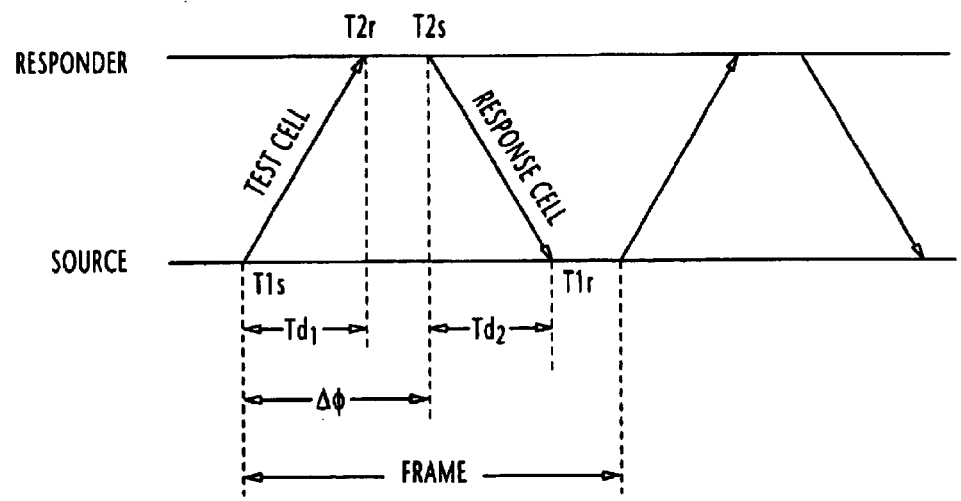
FIG. 8C  HANDSHAKING MODE

FIG. 9
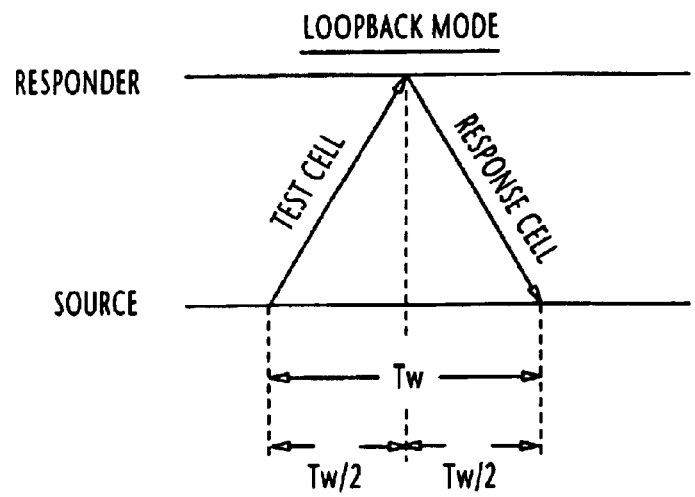
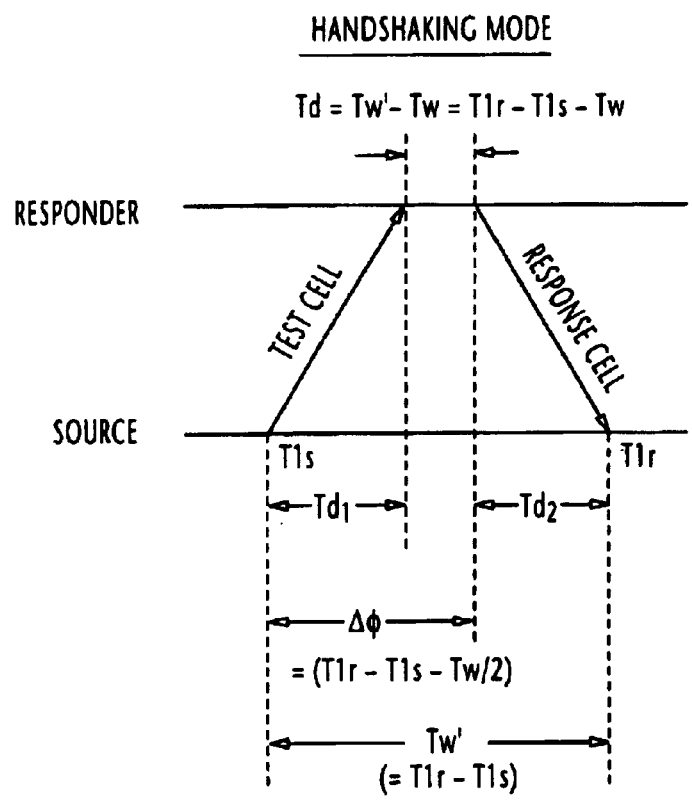

ATM TEST EQUIPMENT OPERABLE AS SOURCE AND RESPONDER FOR CONDUCTING MULTIPLE TESTS

BACKGROUND OF THE INVENTION

1. Field of the Invention

The present invention relates generally to testing of a communications network, and more specifically to equipment and method for testing ATM (asynchronous transfer mode) switches and networks.

2. Description of the Related Art

In the asynchronous transfer mode, digital signals are segmented into blocks called "cells" of fixed length and each cell is transmitted with a header containing source and destination addresses and cell type information and so forth. ATM transmission systems are tested in a number of aspects including the inter-node connectivity between nodes (or ATM switches), the intra-node connectivity, the transmission quality, the one-way transit (propagation delay) times and round-trip transit time between nodes in order to assess the cell delay variation of the ATM transmission system. The frame timing difference between nodes is another measurement item to be tested.

It is the usual practice for ATM maintenance routines to provide out-of-service measurement by isolating lines and equipment from working facilities before they are subjected to measurement. For in-service measurement, the ITU-T Recommendation I.610 states that information flows F4 and F5 be used respectively at the virtual path and virtual channel planes across ATM nodes. However, complex circuitry would be required for implementing a test on ATM networks at the level of virtual channel with the F5 flow information. Hence, the VC level testing is not Gently supported.

Therefore, in-service connectivity test is currently performed on an end-to-end basis and in-service propagation delay time measurements are currently conducted by network nodes.

SUMMARY OF THE INVENTION

It is therefore an object of the present invention to provide an ATM test equipment that supports in-service measurement of ATM switches and networks at the level of virtual channels using the information flow F5.

According to one aspect of the present invention, there is provided an ATM test equipment comprising transponder circuitry for formulating an ATM test cell, according to a selected one of predetermined test modes, with a header identifying a test point and a response point and a test mode value identifying the selected test mode, transmitting the test cell to an ATM switching system (switch or network), and receiving a response cell containing the test mode value from the ATM switching system, and measurement circuitry for analyzing data contained in the received response cell according to the test mode value of the response cell.

According to another aspect, the present invention provides an ATM testing system for testing an ATM network between a source node and a responder node, wherein the source node comprises transponder circuitry for formulating a test cell, according to a selected one of predetermined test modes, with a header identifying the source node and the responder node and a test mode value identifying the selected test mode, transmitting the test cell to the ATM network, and receiving a response cell containing the test mode value from the network, and measurement circuitry for analyzing data contained in the received response cell according to the test mode value contained therein. The responder node receives the test cell and formulates a response cell, according to the test mode value of the received test cell, with a header identifying the responder node and the source node and the test mode value of the received test cell, and transmits the formulated response cell to the network.

The responder node may be configured to formulate a response cell with a copy of data contained in the received test cell, and transmit the response cell to the network without delay. The source node may includes timing circuitry for producing a first time record indicating the transmit time of the test cell and a second time record indicating the receive time of the response cell. The measurement circuitry is configured to use the first and second time records to determine a round-trip propagation delay time. The responder node may include time stamp circuitry for producing a first time stamp indicating the receive time of the test cell and a second time stamp indicating the transmit time of the response cell. The first and second time stamps are inserted in the response cell and transmitted. The measurement circuitry is configured to use the first and second time records of the time-stamp circuitry and the first and second time stamps of the received response cell to determine a propagation delay time of a first channel in the direction from the source node to the responder node, and a propagation delay time of a second channel in the direction from the responder node to the source node.

According to a further aspect, the present invention provides a method of testing an ATM network, comprising the steps of (a) at a source node, formulating, according to a selected one of predetermined test modes, a test cell with a cell header identifying the source node and a responder node and a test mode value identifying the selected test mode, and transmitting the cell to the ATM network, (b) receiving, at the responder node, the test cell and formulating, according to the test mode value of the received test cell, a response cell containing a cell header identifying the source node and the responder node and the test mode value of the received test cell, and transmitting the response cell to the network, (c) receiving, at the source node, the response cell from the network, and (d) analyzing, at the source node, data contained in the received response cell according to the test mode value of the received response cell.

According to a further aspect of the present invention, there is provided a method of testing an ATM switch between a source point and a response point, the source and response points being connected to the ATM switch, comprising the steps of (a) at the source point, formulating, according to a selected one of predetermined test modes, a test cell containing a header identifying the source and response points and a test mode value identifying the selected test mode, and transmitting the cell to the ATM switch, (b) at the response point, receiving the test cell and formulating a response cell with a header identifying the source and response points and the test mode value of the received test cell, and transmitting the response cell to the ATM switch, (c) at the source point, receiving the response cell from the ATM switch, and (d) at the source point, analyzing data contained in the received response cell according to the test mode value of the received response cell.

BRIEF DESCRIPTION OF THE DRAWINGS

The present invention will be described in detail further with reference to the following drawings, in which:

FIGS. 5A and 5B are block diagrams of the test equipment of the present invention operating as source and responder nodes, respectively, in the loopback mode;

FIGS. 6A and 6B are block diagrams of the test equipment of the present invention operating as source and responder nodes, respectively, in the two-way mode;

FIGS. 7A and 7B are block diagrams of the test equipment of the present invention operating as source and responder nodes, respectively, in the handshaking mode;

FIGS. 8A, 8B and 8C are timing diagrams illustrating the timing relations of test and response cells when the test equipment are operating in the loopback, two-way and handshaking modes, respectively;

FIG. 9 is a timing diagram illustrating a modified form of the present invention in which the loopback and handshaking modes are combined.

DETAILED DESCRIPTION

Figure 1:
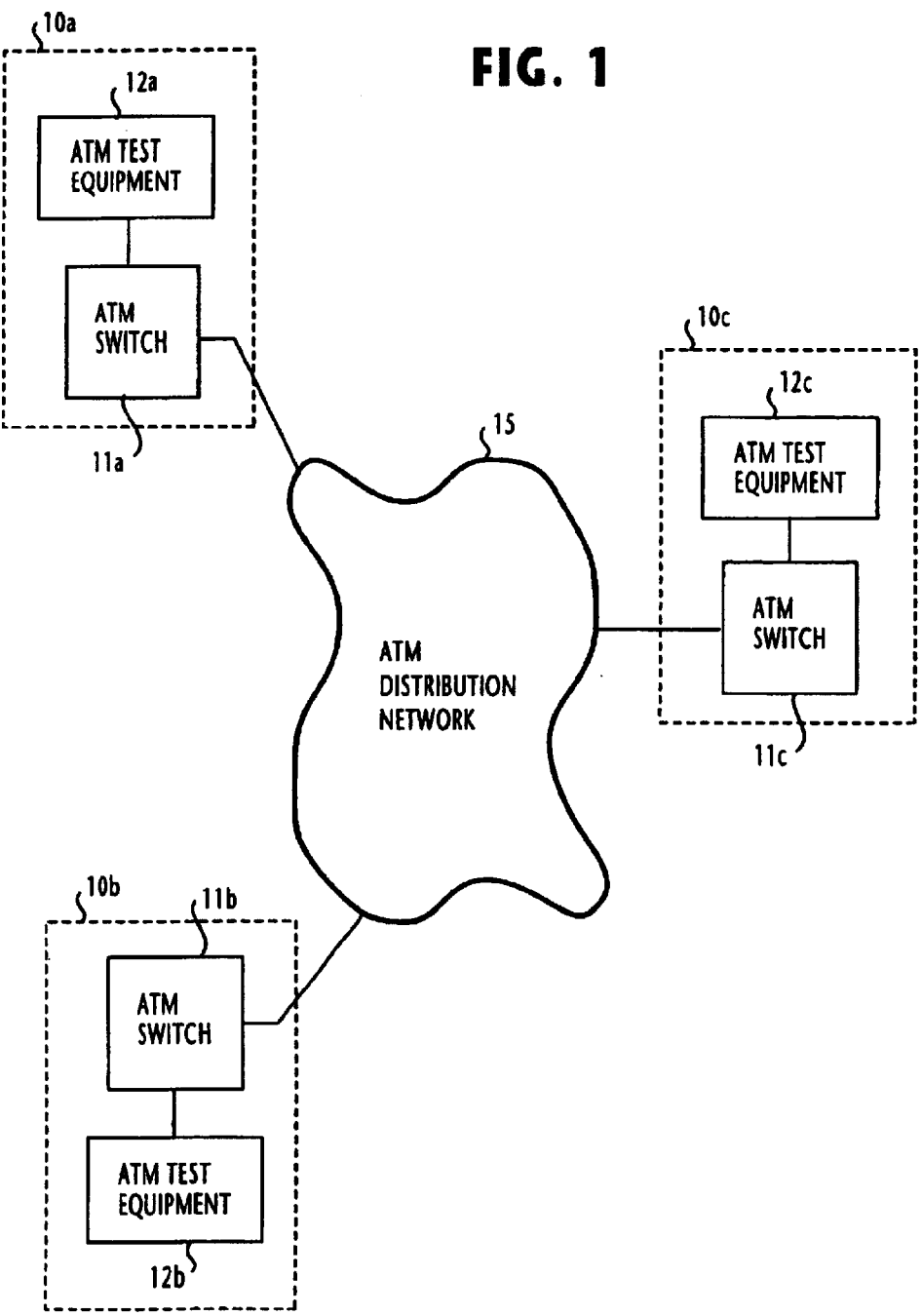
FIG. 1 is a block diagram of a communications network for illustrating ATM test equipment of the present invention.

Referring to FIG. 1, there is shown a communications network incorporating a plurality of test equipment of the present invention.

The communications network is comprised of a plurality of ATM nodes $10a$, $10b$ and $10c$, respectively including ATM switches $11a$, $11b$ and $11c$ and test equipment $12a$, $12b$ and $12c$. ATM nodes $11a$, $11b$ and $11c$ are interconnected by an ATM distribution network 15. ATM switches $11a$, $11b$ and $11c$ and the ATM distribution network 15 provide switching and transfer of ATM cells in the well known manner. When initiating a transmission test, each test equipment 12 operates as a source node or as a responder node. When operating as a source node, the test equipment 12 responds to input test command data for launching a series of "test cells" into the distribution network 15 via the associated ATM switch 11 and waits for a series of "response cells" from the responder node. The test command data specifies one of three test modes, which are loopback mode, two-way mode and handshaking mode. When operating as a responder node, it responds to test cells received from the distribution network 15 via the associated ATM switch 11 according to the test mode specified by the test cells and sends a series of response cells back to the source node.

Figure 2A:
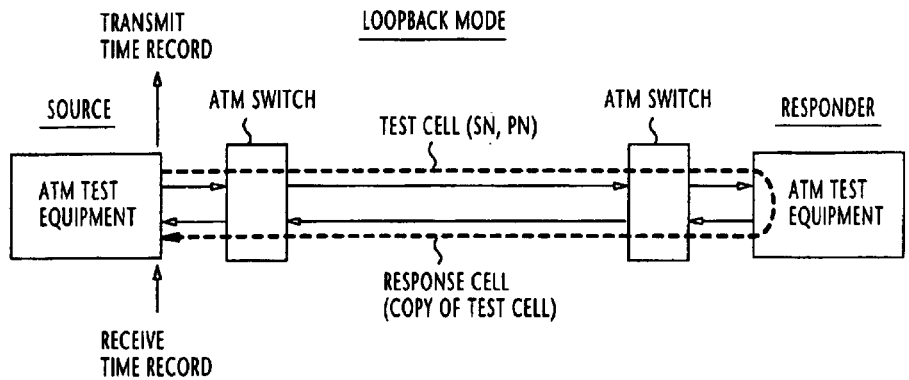
FIGS. 2A, 2B and 2C are schematic diagrams of the loopback, two-way and handshaking modes of operation of the present invention.

As shown in FIG. 2A, when a source node transmits test cells during a loopback mode (mode 1), each response cell the corresponding responder node sends back to the source node is a copy of the received test cell. The round-trip transit time between the nodes and loopback transmission quality (cell loss rate and bit error rate) can be determined.

Figure 2B:
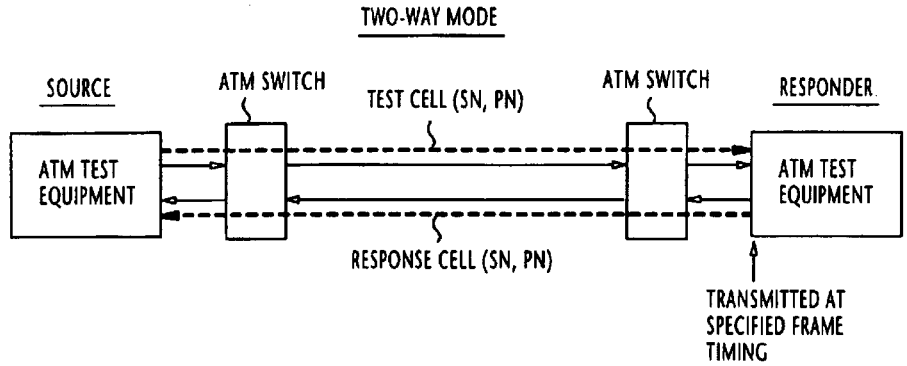

When the source and responder nodes operate in a two-way mode (mode 2), the responder node formulates its own test cell for transmission to the source node as soon as it receives a test cell from the source node and transmits the response cell at the start timing of a specified frame, so that source and responder nodes transmit their cells at independent frame timing as shown in FIG. 2B. In this two-way mode, transmission quality can be determined in respective directions of transmission.

Figure 2C:
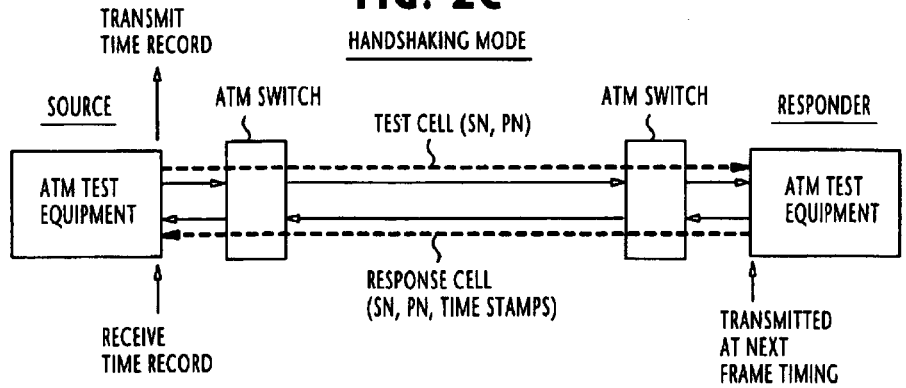

During a handshaking mode (mode 3), test cells and response cells are exchanged in a manner similar to that shown in FIG. 2C. However, the test cells contain dummy data in its data field and the response cells contain receive and transmit time stamps. The responder node transmits response cells as soon as they are formulated. Go-path and return-path transit times and frame timing difference between the nodes and cell loss rates can be determined.

Figure 3A:
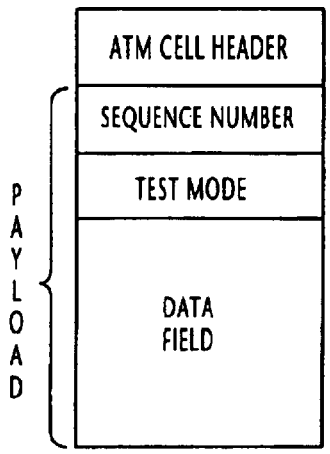
FIG. 3A shows the data structure of ATM test and response cells used in the present invention, with FIGS. 3B and 3C illustrating the data structures of source and responder nodes operating in loopback and two-way modes, respectively, and FIGS. 3D and 3E the respective data structures of source and responder nodes both operating in the handshaking mode.

FIG. 3A shows the data structure of the test and response cells of the present invention. Each of the test and response cells is composed of a 5-byte ATM cell header and a 48-byte payload which is divided into a sequence number field, a test mode field and a data field. The cell header indicates the type of cell (test or response cell) and contains source and destination addresses. The sequence number field of a cell is used to contain a sequence number (SN) to allow recipient to count and determine a cell loss rate from the ratio of the number of lost cells to the total number of cells transmitted. The test mode field of a cell is used to indicate in which test mode the source and responder nodes must conduct measurements. In the specification, the loopback, two-way and handshaking modes are identified by test mode values 1, 2 and 3, respectively.

Figure 3B:
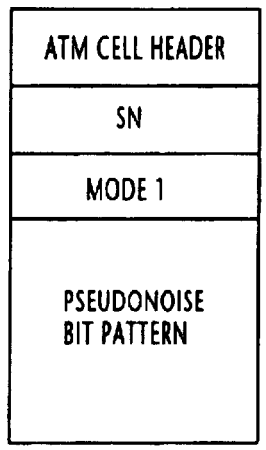
Figure 3C:
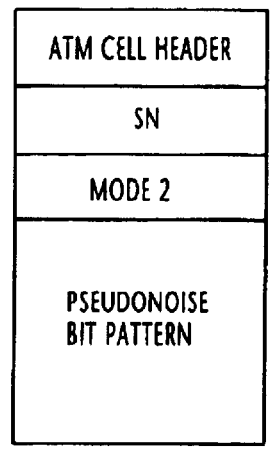

As shown in FIGS. 3B and 3C, when the test mode is loopback or two-way mode, the mode value 1 or 2 is inserted in the test mode field and their data field contains a pseudonoise bit pattern. This bit pattern is used by recipient to evaluate a bit error rate.

Figure 3D:
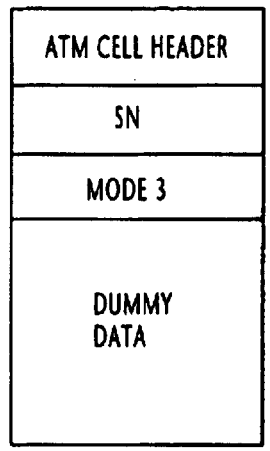
Figure 3E:
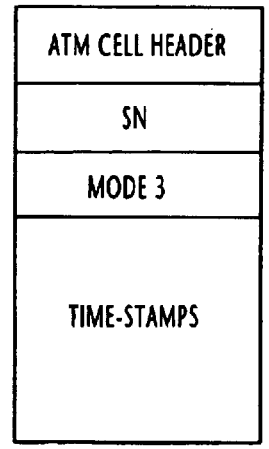

When the test mode value is 3, the data field of a test cell contains dummy data (FIG. 3D) and the data field of a response cell contains time-stamps indicating the arrival time of a test cell at the responder node and the transmit time of a response cell from the responder node (FIG. 3E).

Figure 4:
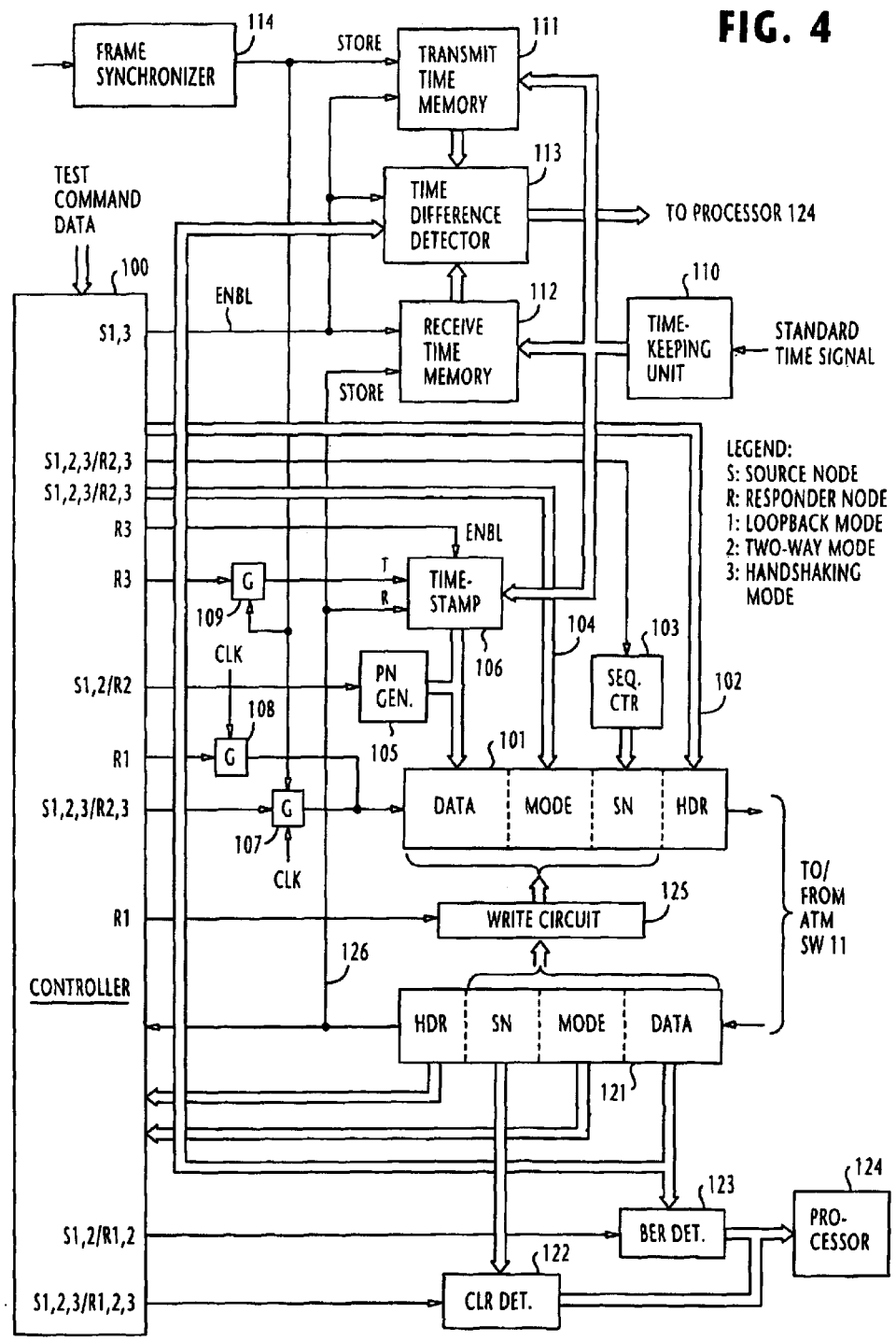
FIG. 4 is a block diagram of each ATM test equipment of the present invention.

ATM test equipment $12a$, $12b$ and $12c$ are of identical construction. As shown in detail in FIG. 4, each test equipment is comprised of a controller 100 for providing overall control of the test equipment according to input command data supplied from an external source, not shown.

A 53-byte transmit cell memory, or shift register 101 is provided, which is divided into a plurality of fields for formulating a test cell with the header and payload information. Header information is supplied on a bus 102 from the controller 100 and a sequence number from a sequence counter 103 that is directed by the controller to increment its count value by one when a cell is forwarded to the ATM distribution network, and a test mode value is supplied on a bus 104. The sequence number, mode value and data fields of all cells are determined by the controller 100 except for a response cell that is transmitted back to the source node during test mode 1 (loopback mode).

When the equipment is operating as a source node in test mode 1 or 2 or as a responder node in test mode 2, the controller 100 enables a PN generator 105 to supply a pseudonoise bit pattern to the data field of the shift register 101.

When the test equipment is operating as a responder node in test mode 3, the controller 100 enables a time-stamp generator 106 to fill the data field of the shift register 101 with time-stamp data using a time-of-day signal from a time-keeping unit 110. Time-keeping unit 110 is constantly calibrated to a standard time signal supplied from a common precision time signal source such as GPS (global position system) or local standard time. Alternatively, all nodes of the network may constantly exchange time-of-day data to calibrate their time-keeping unit to a single time source.

Once the transmit shift register 101 is loaded according to a given test mode, the controller 100 enables a gate 107 to respond to a frame timing signal from a known frame synchronizer 114 for supplying shift clock pulses to the shift register 101 to cause the loaded information to be forwarded to the associated ATM switch 11, so that the transmitted cell is properly embedded in a frame of a specified format. This frame timing signal indicates the timing at which a given node is allowed to transmit a cell in a frame. Hence two frame timing signals define the interval between two ATM cells successively transmitted from the given node. This frame timing signal is used by a responder node during test mode 1 in which it returns a response cell immediately following the receipt of a test cell for the determination of a round-trip propagation delay time. In this case, the controller 100 enables a gate 108 to supply shift clock pulses to the shift register 101 as soon as the latter is loaded.

A 53-byte receive cell memory, or shift register 121 is provided, which is also divided into a plurality of fields corresponding to the cell format of the present invention. Shift register 12 receives a test cell from the network via the associated ATM switch 11 to read the header information and the mode value into the controller 100. The sequence number of the cell is delivered to a cell loss rate (CLR) detector 122 and the content of the data field is supplied to a bit error rate (BER) detector 123. The outputs of the CLR and BER detectors 122 and 123 are fed to a data processor 124 in which measurement data are statistically processed to enhance the level of measurement precision.

In response to receipt of a test cell, the controller 100 examines its cell header and knows that the test equipment must operate as a responder node and examines its test mode field. If the test mode value "1" is indicated, the controller 100 enables a write circuit 125 for copying the sequence number, the test mode value and the PN pattern from the receive shift register 121 into the corresponding fields of the transmit shift register 101.

For determining the transit times and frame timing difference between the source and responder nodes, a transmit time memory 111 and a receive time memory 112 are connected to the time-keeping unit 110 and a time difference detector 113 is connected to the outputs of both memories 111 and 112. Memories 111 and 112 and the time difference detector 113 are enabled when the test equipment is operating as a source node for conducting a test in mode 1 or 3.

When enabled by the controller 1001 the transmit time memory 111 stores the output of time-keeping unit 110 in response to a frame timing signal from the frame synchronizer 114 to record the time of day at which a test cell is transmitted. Likewise, the receive time memory 112 stores the output of the time-keeping unit in response to a response cell arriving on the shift register 121 as indicated by a signal on line 126. On the other hand, the time difference detector 113 receives time-stamp data contained in the data field of shift register 121. When source and responder nodes operate in the test mode 1 (loopback mode), the output of time difference detector 113 represents the inter-node round-trip transit time. If they are operating in test mode 3 (handshaking mode), the time difference detector 113 produces outputs that represent the inter-node go-path transit time, the inter-node return-path transit time and the inter-node frame timing difference. The output signals of time difference detector 113 are supplied to the data processor 124, where they are processed to determine a cell delay variation of the network.

The operation of the test equipment will be described below with the aid of FIGS. 5A, 5B, 6A, 6B, 7A and 7B, in which elements enabled by the controller 100 during each test mode are indicated with thick lines. For convenience, source and responder nodes are identified as nodes Si and Ri, respectively, where "i" indicates the test mode.

Figure 5B:
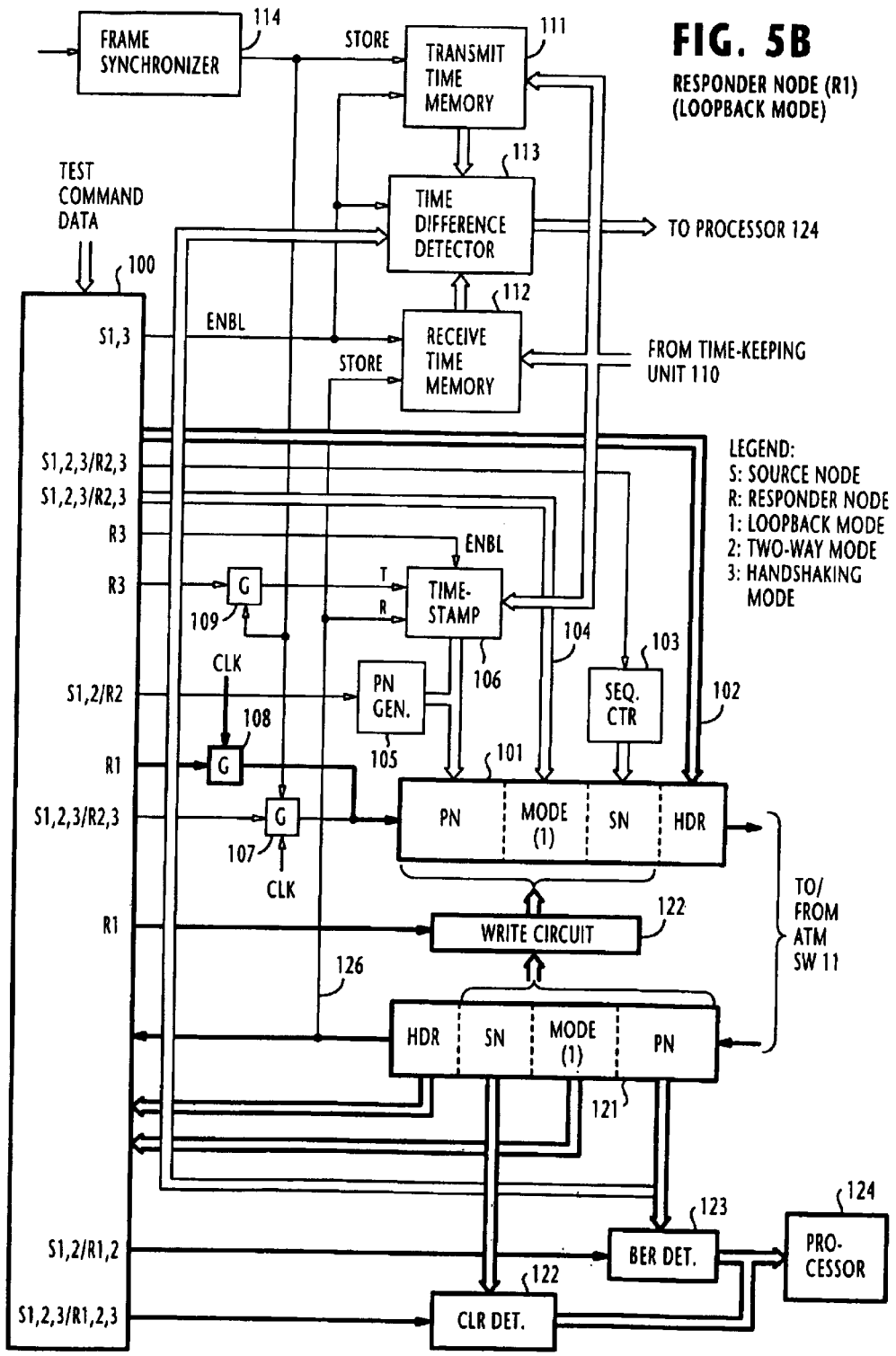

FIG. 5A illustrates the test equipment operating as a source node (S1) in test mode 1, and FIG. 5B illustrates the test equipment operating as a responder node (R1) in test mode 1.

In FIG. 5A, the controller 100 of the S1 node responds to input test command data for incrementing the sequence counter 103 by one, enabling the PN generator 105 and setting a mode value "1" through bus 104 into the shift register 101. A test cell is formulated in the shift register 101 when header information is supplied from bus 102. The cell header contains a cell type and address information for identifying the local source node and a remote responder node. Controller 100 then enables the gate 107 to respond to a frame timing signal from the frame synchronizer 114 for applying clock pulses to the shift register 101 so that the test cell is shifted along the shift register and forwarded onto the network. Transmit and receive time memories 111 and 112 and the time difference detector 113 are enabled. As a result, the transmit time memory 111 records the transmit time (Ts) of the test cell.

In FIG. 5B, the responder (R1) node receives a test cell by the shift register 121. In response, the controller 100 examines the cell header and the test mode field information of the test cell and enables the write circuit 122 to copy the payload data of the test cell from the receive shift register 121 into the payload field of the transmit shift register 101. A response cell is formulated in the shift register 101 when header information is supplied from the controller 100. The header information includes the cell type and source and destination addresses respectively identifying the local responder node and the remote source node. Controller 100 then enables the gate 108 to supply shift clock pulses to the shift register 101 to forward the response cell to the network. Thus, a response cell can be transmitted immediately following the receipt of a test cell. On the other hand, the sequence number in the receive shift register 121 is loaded into the cell loss rate detector 122. Cell loss rate detector 122 of the responder node counts the sequence number of received test cells and compares it against a predetermined value and determines the cell loss rate of the transmission channel measured in the direction from the source node to the responder node. The pseudonoise bit pattern in the receive shift register 121 is loaded into the bit error rate detector 123, where bits in error are counted to determine the bit error rate of the transmission channel measured in the direction from the source node to the responder node.

Returning to FIG. 5A, the response cell is received in the shift register 121 of the source node (S1) and the cell loss rate and the bit error rate are determined respectively by the CLR detector 122 and BER detector 123. Since the received sequence number and pseudonoise pattern are each copy of those received by the responder node and subjected to a further travel in the opposite direction, the outputs of the CLR and BER detectors respectively represent the total cell loss rate and the total bit error rate of the loopback transmission channel. The arrival of the response cell is signaled by line 126 to the receive time memory 112, which in response stores the output of the time-keeping unit 110 to record the receive time (Tr) of the response cell. The recorded transmit time (Ts) of the test cell and the recorded receive time (Tr) of the response cell are respectively supplied from memories 111 and 112 to the time difference detector 113 to produce an output signal indicating the round-trip transit time Tw (which equals Tr−Ts) as shown in FIG. 8A.

FIG. 6A illustrates the test equipment operating as a source node (S2) in a test mode 2, and FIG. 6B illustrates the test equipment operating as a responder node (R2).

In FIG. 6A, the controller 100 of the S2 node responds to input test command data for incrementing the sequence counter 103 by one, enabling the PN generator 105 and setting a mode value "2" through bus 104 into the shift register 101. A test cell is formulated in the shift register 101 when header information is supplied from bus 102. Controller 100 then enables the gate 107 to respond to a frame timing signal from the frame synchronizer 114 for transmitting the test cell to the network.

In FIG. 6B, when the transmitted test cell is received in the shift register 121 of the responder (R2) node, the controller 100 examines the received header and test mode field information and increments the sequence counter 103 by one, enables the PN generator 105 and sets the mode value "2" in the transmit shift register 101. A response cell is formulated in the transmit shift register 101 when header information including the cell type and source and destination addresses is supplied from the controller 100. Controller 100 then enables the gate 107 to start supplying shift clock pulses in response to a frame timing signal that is generated by the frame synchronizer 114 at the start timing of a specified frame to the shift register 101 to forward the response cell to the network. Therefore, the timing relation between test cells and response cells are exchanged at independent frame timing between the source and responder nodes as shown in FIG. 8B. Similar to test mode 1, the sequence number and pseudonoise pattern in the receive shift register 121 are loaded into the cell loss rate detector 122 and bit error rate detector 123 to determine the cell loss rate and the bit error rate of the transmission channel of the direction from the source node to the responder node.

Returning to FIG. 6A, when the response cell is received in the shift register 121 at the source node (S2), the cell loss rate and the bit error rate are determined by the CLR and BER detectors 122 and 123, respectively, from the sequence number and PN bit pattern of the received cell. In contrast to test mode 1, the outputs of the CLR and BER detectors during test mode 2 represent the respective qualities of the transmission channel measured in the direction from the responder node to the source node, rather than the qualities of the loopback channel.

Figure 7B:
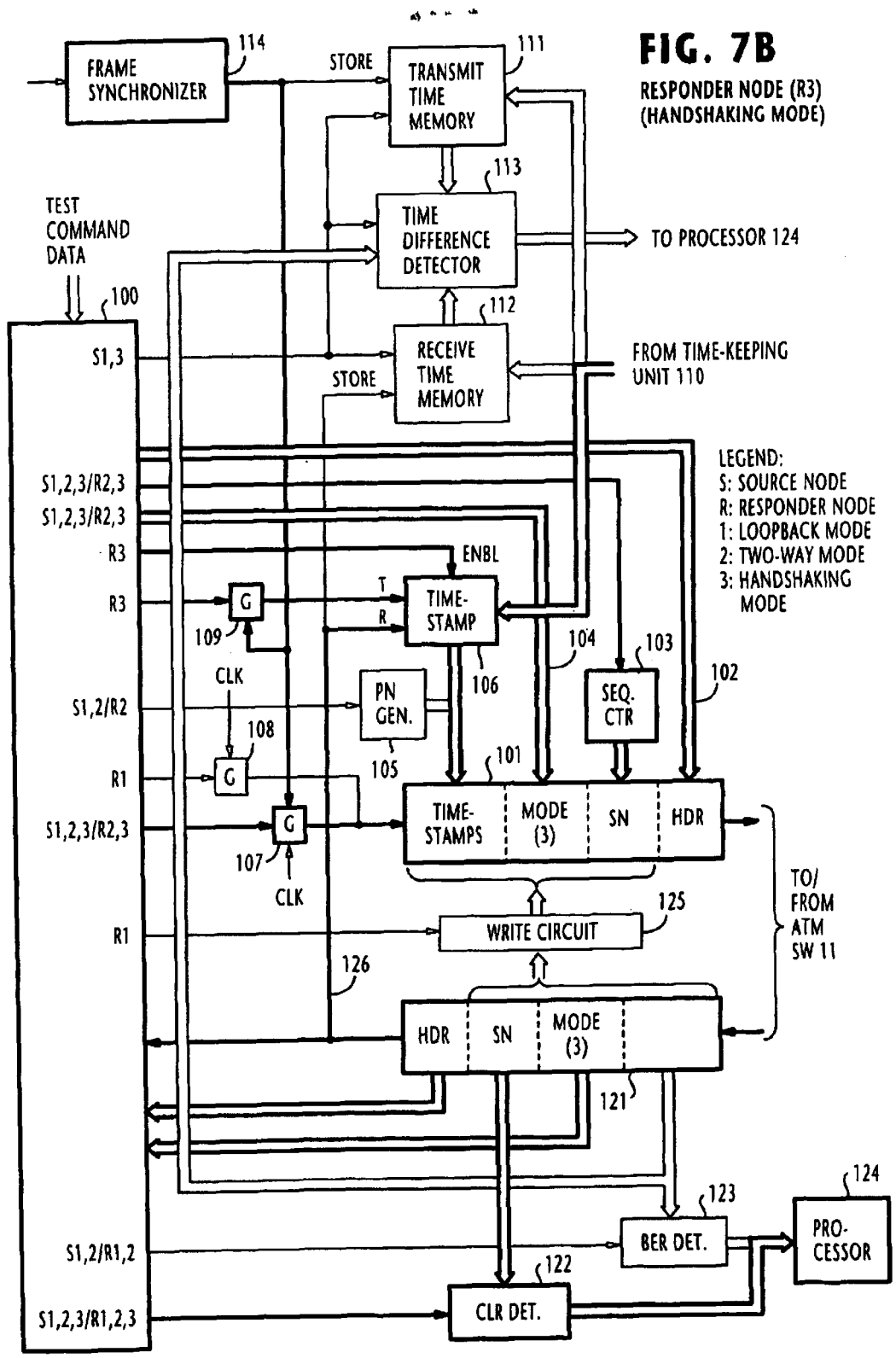

FIG. 7A illustrates the test equipment operating as a source node (S3) in a test mode 3, and FIG. 7B illustrates the test equipment operating as a responder node (R3).

In FIG. 7A, the controller 100 of the S3 node responds to input test command data for incrementing the sequence counter 103 by one, enabling the PN generator 105 and setting a mode value "3" through bus 104 into the shift register 101 to formulate a test cell in the shift register 101 with header information. Controller 100 enables the gate 107 to start supplying clock pulses to the shift register 101 in response to a frame timing signal from the frame synchronizer 114. Similar to test mode 1, the transmit and receive time memories 11 and 112 and the time difference detector 113 of the source node S3 are enabled, and the transmit time memory 111 records the transmit time (T1s) of the test cell.

In FIG. 7B, when the responder (R3) node receives a test cell in the shift register 121, the controller 100 examines its header and test mode field information and enables the time-stamp generator 106 to produce a time stamp indicating the arrival time (T2r) of the test cell which is signaled by line 126. Shift register 101 is supplied with header information, a sequence number and a test mode value "3". When a response cell has been formulated in the transmit shift register 101 except for time stamps to be inserted in its data field, the time stamp generator 106 is activated again in response to a frame timing signal from the synchronizer 114 that is produced immediately following the receipt of a test cell. Accordingly, a time stamp is produced by the time stamp generator 106, indicating the transmit time (T2s) of the response cell. This is achieved by the controller 100 by enabling a gate 109 to pass such a frame timing signal to the time stamp generator 106 when the shift register 121 senses that it has received a test cell from the source node. Time stamp values of both receive and transmit times (T2r and T2s) are supplied from the time stamp generator 106 to the transmit shift register 101 and inserted in the data field, thus completing a response cell. Controller 100 enables the gate 107 to supply shift clock pulses to the shift register 101 to forward the response cell to the network immediately after the time stamp data are set in the data field of the shift register 101.

On the other hand, the sequence number in the receive shift register 121 is supplied to the CLR detector 122 to determine the cell loss rate of the channel in the direction from the source node to the responder node. Since no pseudonoise pattern is transmitted during test mode 3, the bit error rate of the test cell is not determined.

Returning to FIG. 7A, the response cell is received in the shift register 121 of the source node (S3) and the cell loss rate of the channel in the direction from the responder node to the source node is determined by the CLR detector 122. The arrival of the response cell is signaled by line 126 to the receive time memory 112, which responds by storing the output of the time-keeping unit 110 to record the receive time (T1r) of the response cell. The recorded cell transmit time (T1s) and cell receive time (T1r) are supplied from memories 111 and 112 to the time difference detector 113 and the time stamp data (T2r and T2s) is loaded from the shift register 121 into the time difference detector 113. As will be understood from FIG. 8C, the time difference detector 113 determines the frame timing difference ΔΦ and the go-path transit time $Td_1$ and return-path transit time $Td_2$ by solving the following equations:

$$\Delta\Phi = T2s - T1s \qquad (1)$$

$$Td_1 = T2r - T1s \qquad (2)$$

$$Td_2 = T1r - T2s \qquad (3)$$

In addition, the measurements of the go-path and return-path transit times and the frame timing difference can also be made at the responder node if the source node produces a time-stamp copy T2r of the receive time T1r of the response cell and a time-stamp copy T2s of the transmit time T1s of the next test cell and inserts these time-stamp copies in the data field of the next test cell for transmission to the responder node.

The use of time stamps is only useful for applications where common standard time is available. Otherwise, the reliability of time stamp data is lost. In such instances, the round-trip transit time Tw obtained during the test mode 1 is halved to produce a value Tw/2. As illustrated in FIG. 9, the frame timing difference $\Delta\phi$ and the go-path transit time $Td_1$ and the return-path transit time $Td_2$ are obtained as follows:

$$\Delta\phi = Tw' - Tw/2 = T1r - T1s - Tw/2 \quad (4)$$

$$Td_1 \Delta\phi - Td = \Delta\phi - T1r + T1s + Tw \quad (5)$$

$$Td_2 = Tw' - \Delta\phi = T1r - T1s - \Delta\phi \quad (6)$$

Figure 10:
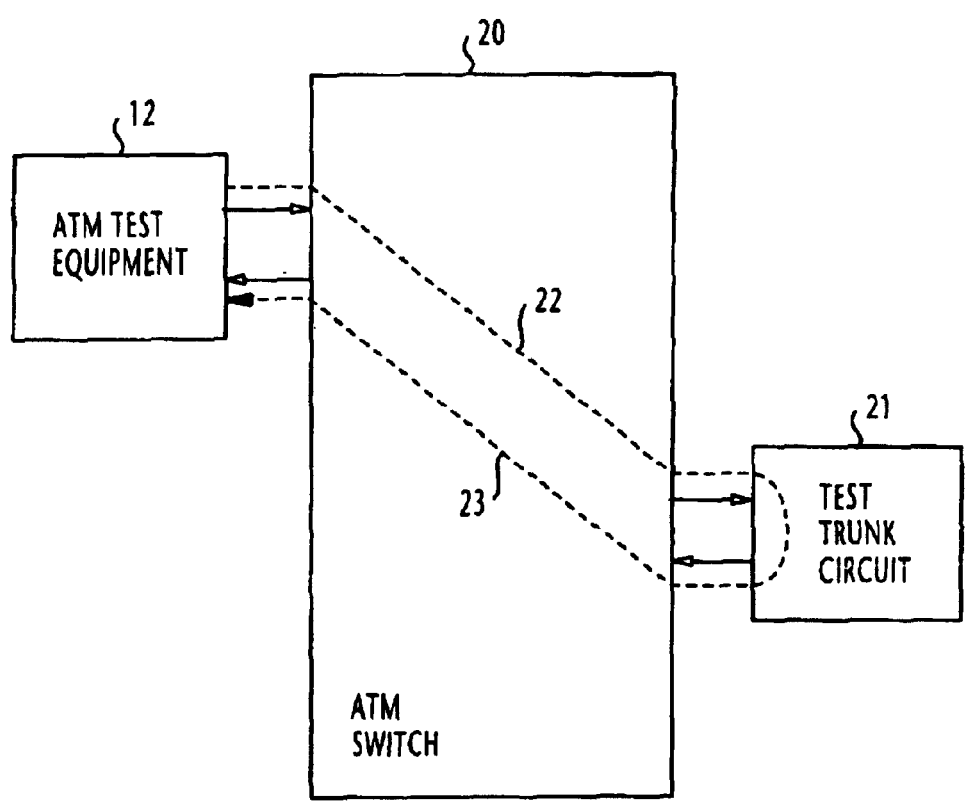
FIG. 10 is a block diagram of an ATM switching system in which the test equipment of the present invention is used for testing connections established in an ATM switch.

The test equipment of the present invention is useful for performing a loopback test (test mode 1) on an ATM switch in order to ascertain the connectivity of paths established in the ATM switch. As shown in FIG. 10, a test trunk circuit 21 is connected to one side of an ATM switch 20 and the test equipment 12 is connected to the other side of the ATM switch 20. Test equipment 12 formulates a test cell with a cell header containing the source and destination addresses respectively identifying the test equipment 12 and the test trunk circuit 21. The test mode field of the cell contains a test mode value "1" and the data field contains a PN bit pattern. Test trunk circuit 21 forms a loopback circuit so that it operates as a responder node R1. A test cell from the test equipment 12 establishes a go-path connection 22 within the ATM switch 20 and a response cell from the test trunk circuit 21 establishes a return-path connection 23. Test trunk circuit 21 receives test cells through the go-path connection 22. On receiving a test cell, the test trunk circuit 21 formulates a response cell with a new cell header identifying the test trunk circuit as a source address and the test equipment 12 as a destination address. A copy of the payload received on the test cell is inserted to the payload field of the response cell. The response cell is sent through the return-path connection 23 back to the test equipment 12.

Test equipment 12 analyzes data contained in the sequence number and PN fields of received response cells with the CLR and BER detectors 122 and 123 and ascertain the connectivity of established ATM connections.

What is claimed is:

1. An ATM test equipment comprising:

transponder circuitry for formulating an ATM test cell, according to a selected one of predetermined test modes, with a header identifying a test point and a response point and a test mode value identifying the selected test mode, transmitting the test cell to an ATM switching system, and receiving a response cell containing said test mode value from the ATM switching system; and measurement circuitry for analyzing data contained in the received response cell according to the test mode value of the response cell, wherein said data is a sequence number of a cell and said measurement circuitry is configured to use the sequence number of the received response cell to determine a cell loss rate.

2. The ATM test equipment of claim 1, wherein said data is a pseudonoise bit pattern and said measurement circuitry is configured to use the pseudonoise bit pattern contained in the received response cell to determine a bit error rate.

3. The ATM test equipment of claim 1, wherein said transponder circuitry is configured to:

receive said test cell from the ATM switching system;

formulate said response cell with a header identifying said test point and said response point and a copy of data contained in the received test cell, and transmit the response cell to said ATM switching system.

4. The ATM test equipment of claim 1, further comprising timing circuitry for producing a first time record indicating the transmit time of said test cell and a second time record indicating the receive time of said response cell, and wherein said measurement circuitry is configured to use said first and second time records to determine a propagation delay time.

5. An ATM testing system for testing an ATM network between a source node and a responder node, said source node comprising:

transponder circuitry for formulating a test cell, according to a selected one of predetermined test modes, with a header identifying said source node and said responder node and a test mode value identifying the selected test mode, transmitting the test cell to said ATM network, and receiving a response cell containing said test mode value from the network; and measurement circuitry for analyzing data contained in the received response cell according to the test mode value contained therein, said responder node comprising transponder circuitry for receiving said test cell and formulating a cell, according to the test mode value of the received test cell, with a header identifying said responder node and said source node and the test mode value of the received test cell, and transmitting the formulated cell to said network as said response cell, wherein said responder node is configured to formulate said response cell with a copy of data contained in the received test cell, and transmit the response cell to said network without delay.

6. The ATM testing system of claim 6, wherein said copied data is a cell sequence number and the measurement circuitry of the source node is configured to use the cell sequence number contained in the received response cell to determine a cell loss rate.

7. The ATM testing system of claim 5, wherein said copied data is a pseudonoise bit pattern and the measurement circuitry of the source node is configured to use the pseudonoise bit pattern contained in the received response cell to determine a bit error rate.

8. The ATM testing system of claim 5, wherein said source node further comprises timing circuitry for producing a first time record indicating the transmit time of said test cell and a second time record indicating the receive time of said response cell, wherein the measurement circuitry is configured to use said first and second time records to determine a round-trip propagation delay time.

9. The ATM testing system of claim 8, wherein said responder node further comprises time stamp circuitry for producing a first time stamp indicating the receive time of said test cell and a second time stamp indicating the transmit time of said response cell, wherein the responder node is configured to insert said first and second time stamps in the response cell, wherein said measurement circuitry is configured to use said first and second time records of said time-stamp circuitry and said first and second time stamps of the received response cell to determine a propagation delay time of a first channel in the direction from said source node to said responder node, and a propagation delay time of a second channel in the direction from said responder node to said source node.

10. The ATM testing system of claim 9, wherein said transponder circuitry is configured to transmit said test cell in response to a first frame timing signal and wherein said responder node is configured to transmit said response cell in response to a second frame timing signal which occurs immediately following the receipt of the test cell from the network.

11. The ATM testing system of claim 10, wherein the measurement circuitry is configured to use said first and second time records and said first and second time stamps to determine a timing difference between said source and responder nodes.

12. The ATM testing system of claim 5,
wherein the transponder circuitry is configured to transmit said test cell in response to a first frame timing signal, and said responder node is configured to transmit said response cell in response to a second frame timing signal,
wherein said copied data is a cell sequence number and the measurement circuitry of the source node is configured to use the cell sequence number contained in the received response cell to determine a cell loss rate.

13. The ATM testing system of claim 5,
wherein said transponder circuitry is configured to transmit said test cell in response to a first frame timing signal, and said responder node is configured to transmit said response cell in response to a second frame timing signal,
wherein said copied data is a pseudonoise bit pattern and the measurement circuitry of the source node is configured to use the pseudonoise bit pattern contained in the received response cell to determine a bit error rate.

14. The ATM testing system of claim 5,
wherein said responder node, when operating in a first test mode, is configured to formulate said response cell with a copy of data contained in the received test cell and transmit the response cell to said network without delay,
wherein the transponder circuitry, when operating in said first test mode, is configured to produce a first time record indicating the transmit time of said test cell and a second time record indicating the receive time of said response cell,
wherein the transponder circuitry, when operating in a further test mode, is configured to formulate a second test cell according to the further test mode with header information identifying said source and responder nodes and a second test mode value identifying the further test mode, transmit the second test cell to said network in response to a first frame timing signal, and produce a third time record indicating the transmit time of the second test cell,
wherein said responder node, when operating in said further test mode, is configured to receive the second test cell from the network, formulate a second response cell with a header identifying said source and said responder nodes according to the second test mode value of the received test cell, and transmit the second response cell to the network in response to a second frame timing signal which occurs immediately after said second response cell is formulated,
wherein the transponder circuitry, when operating in said further test mode, is configured to produce a fourth time record indicating the receive time of said second response cell, and
wherein the measurement circuitry, when operating in said further test mode, is configured to determine from said third and fourth time records, a timing difference between said source and remote responder nodes, a first propagation delay time of a first channel in a direction from said source node to a remote responder node, and a second propagation delay time of a second channel in a direction from said remote responder node to said source node.

15. The ATM testing system of claim 14, wherein said source node, when operating in said further test mode, is configured to solve the following equations to determine said timing difference $\Delta\Phi$, said propagation delay time $Td_1$, and said second propagation delay time $Td_2$:

$$\Delta\Phi = T1r - T1s - Tw/2$$

$$Td_1 = \Delta\Phi - T1r + T1s + Tw$$

$$Td_2 = T1r - T1s - \Delta\Phi$$

where Tw represents a round-trip propagation delay time.

16. A method of testing an ATM network, comprising the steps of:
a) at a source node, formulating, according to a selected one of predetermined test modes, a test cell with a cell header identifying said source node and a responder node and a test mode value identifying the selected test mode, and transmitting the cell to said ATM network;
b) receiving, at said responder node, said test cell and formulating, according to the test mode value of the received test cell, a response cell containing a cell header identifying said source node and said responder node and the test mode value of the received test cell and a pseudonoise bit pattern, and transmitting the response cell to said network;
c) receiving, at said source node, said response cell from the network; and
d) analyzing, at said source node, data contained in the received response cell according to the test mode value of the received response cell, and determining a bit error rate of said pseudonoise bit pattern.

17. The method of claim 16, further comprising the step of analyzing, at said responder node, data contained in the test cell received from the network.

18. The method of claim 16, wherein said response cell contains a sequence number, and wherein step (d) comprises determining a cell loss rate by counting a plurality of said sequence number contained in response cells successively received from the network.

19. The method of claim 16,
wherein step (a) comprises producing a first time record indicating the transmit time of said test cell,
wherein step (b) comprises formulating said response cell with a copy of data contained in the received test cell and transmitting the response cell to said network without delay,
wherein step (c) further comprises producing a second time record indicating the receive time of said response cell received from said network, and
wherein step (d) comprises determining a round-trip propagation delay time from said first and second time records.

20. The method of claim 18,
wherein step (a) comprises producing a first time record indicating the transmit time of said test cell,
wherein step (b) comprises formulating the response cell with a copy of said sequence number contained in the received test cell and transmitting the response cell to said network without delay, wherein step (c) comprises producing a second time record indicating the receive time of said response cell, and wherein step (d) comprises determining a cell loss rate of a loopback channel by counting a plurality of said sequence number contained in response cells successively received from the network, and determining a round-trip propagation delay time from said first and second time records.

21. The method of claim 16, wherein step (a) comprises producing a first time record indicating the transmit time of said test cell, wherein step (b) comprises formulating said response cell with a copy of said pseudonoise bit pattern contained in the received test cell and transmitting the response cell to said network without delay, wherein step (c) comprises producing a second time record indicating the receive time of said response cell, and wherein step (d) comprises determining a bit error rate of the pseudonoise bit pattern, and determining a round-trip propagation delay time from said first and second time records.

22. The method of claim 16, wherein step (a) comprises transmitting said test cell in response to a first frame timing signal and producing a first time record indicating the transmit time of said test cell, wherein step (b) comprises producing a first time stamp indicating the receive time of said test cell and a second time stamp indicating the transmit time of said response cell, formulating a second response cell containing said first and second time stamps, and transmitting said second response cell to the network in response to a second frame timing signal, wherein step (c) further comprises producing a second time record indicating the receive time of said second response cell, wherein step (d) comprises determining, from said first and second time records and said first and second time stamps, a propagation delay time of a first channel in a direction from said source node to said responder node, a propagation delay time of a second channel in a direction from said responder node to said source node, and a timing difference between said source and responder nodes.

23. The method of claim 16, wherein step (a) comprises producing a first time record indicating the transmit time of said test cell, wherein step (b) comprises formulating a second response cell with a copy of data contained in the received test cell into said second response cell and transmitting said second response cell to said network without delay, wherein step (c) further comprises producing a second time record indicating the receive time of said second response cell, and wherein step (d) comprises determining a round-trip propagation delay time from said first and second time records, further comprising the steps of:

e) at said source node, formulating, according to a further test mode, a test cell with a cell header identifying said source node and said responder node and a second test mode value identifying the further test mode, transmitting the cell to said ATM network in response to a first frame timing signal, and producing a third time record indicating the transmit time of the test cell;

at said responder node, receiving, said test cell and formulating, according to the test mode value of the received test cell, a response cell containing a cell header identifying said source node and said responder node, and transmitting the response cell to said network in response to a second frame timing signal;

g) at said source node, receiving the response cell from the network and producing a fourth time record indicating the receive time of said response cell; and h) determining, from said third and fourth time records, a timing difference between said source and remote responder nodes, a first propagation delay time of a first channel in a direction from said source node to a remote responder node, and a second propagation delay time of a second channel in a direction from said remote responder node to said source node.

24. The method of claim 23, wherein step (h) comprises solving the following equations to determine said timing difference $\Delta\Phi$, said first propagation delay time $Td_1$, and said second propagation delay time $Td_2$:

$$\Delta\Phi = T1r - T1s - Tw/2$$

$$Td_1 = \Delta\Phi - T1r + T1s + Tw$$

$$Td_2 = T1r - T1s - \Delta\Phi$$

where Tw represents said round-trip propagation delay time.

25. A method of testing an ATM switch between a source point and a response point, said source and response points being connected to said ATM switch, comprising the steps of:

a) at said source point, formulating, according to a selected one of predetermined test modes, a test cell with a header identifying said source and response points and a test mode value identifying the selected test mode, and transmitting the cell to said ATM switch;

b) at said response point, receiving said test cell and formulating a response cell with a header identifying said source and response points and the test mode value of the received test cell and a copy of data contained in the received test cell, and transmitting the response cell to said ATM switch;

c) at said source point, receiving said response cell from the ATM switch; and d) at said source point, analyzing data contained in the received response cell according to the test mode value of the received response cell.

26. The method of claim 25, wherein said response cell contains a sequence number, and wherein step (d) comprises using the sequence number contained in the received response cell to determine a cell loss rate.

27. The method of claim 25, wherein said response cell contains a pseudonoise bit pattern, and wherein step (d) uses said pseudonoise bit pattern to determine a bit error rate.

* * * * *

UNITED STATES PATENT AND TRADEMARK OFFICE
CERTIFICATE OF CORRECTION

PATENT NO. : 6,925,062 B2
APPLICATION NO. : 09/737780
DATED : August 2, 2005
INVENTOR(S) : Hironao Tanaka It is certified that error appears in the above-identified patent and that said Letters Patent is hereby corrected as shown below:

Col. 2, Line 12, delete "includes", insert --include--
Col. 3, Line 26, delete "are", insert --is--
Col. 5, Line 52, delete "1001", insert --100--
Col. 8, Line 1, delete "11", insert --111--
Col. 9, Line 9, (eq. 5) delete "$Td_1\Delta\varphi$", insert --$Td_1=\Delta\varphi$--
Col. 10, Line 31, (claim 6) delete "6", insert --5--

Signed and Sealed this

Twenty-first Day of October, 2008

JON W. DUDAS
*Director of the United States Patent and Trademark Office*